July 17, 1962  A. E. CHAMBERS  3,044,652
METHOD OF ASSEMBLING AND FASTENING LAMINATIONS
Filed Nov. 5, 1958  4 Sheets-Sheet 1
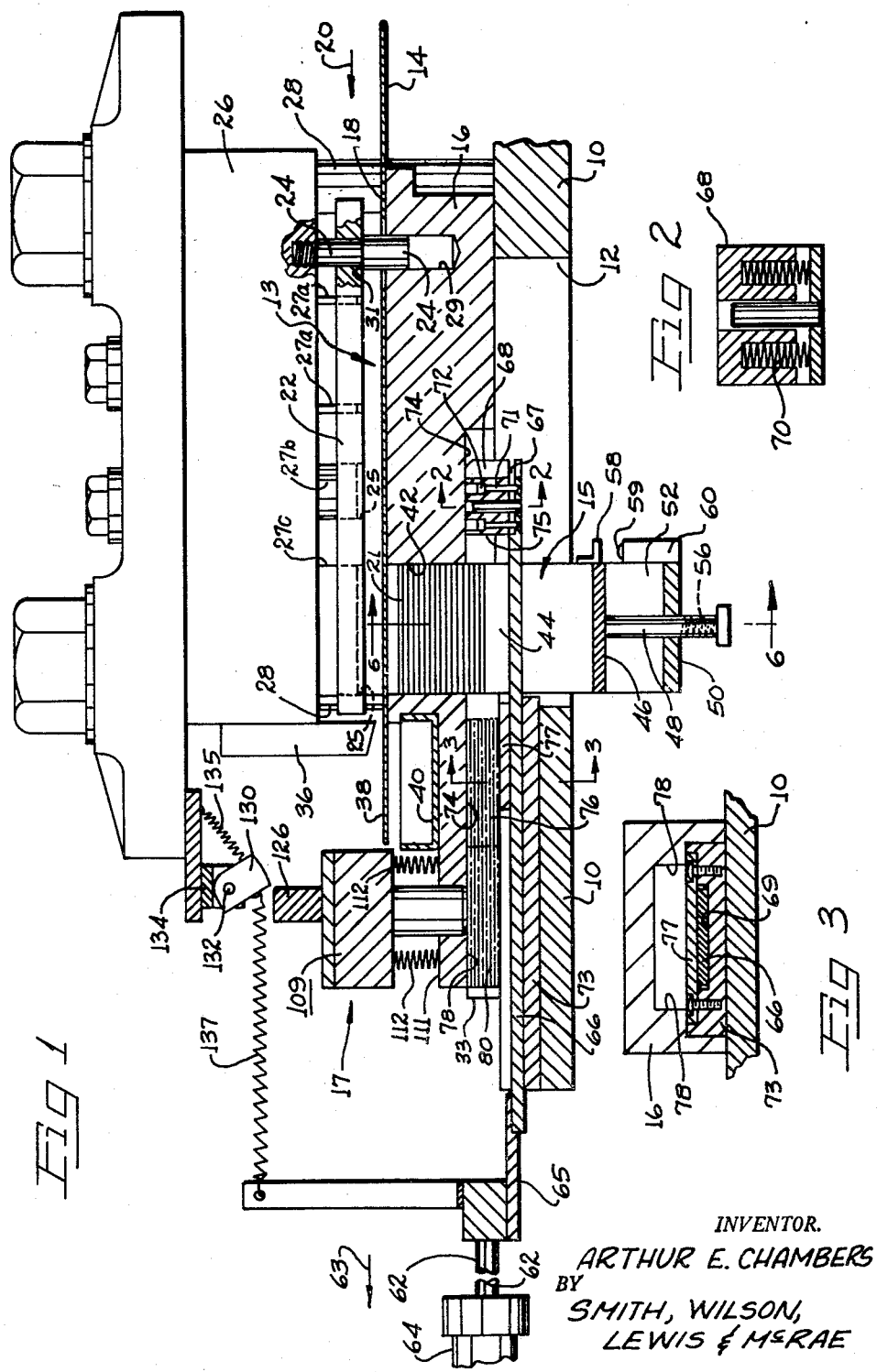
INVENTOR.
ARTHUR E. CHAMBERS
BY
SMITH, WILSON,
LEWIS & McRAE July 17, 1962 A. E. CHAMBERS 3,044,652
METHOD OF ASSEMBLING AND FASTENING LAMINATIONS
Filed Nov. 5, 1958 4 Sheets-Sheet 2
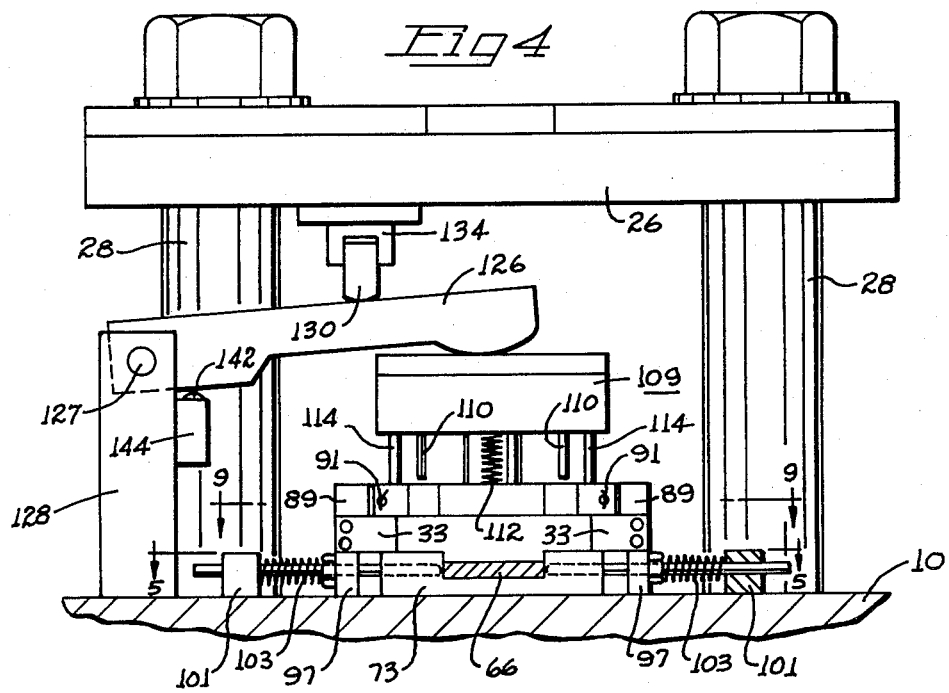
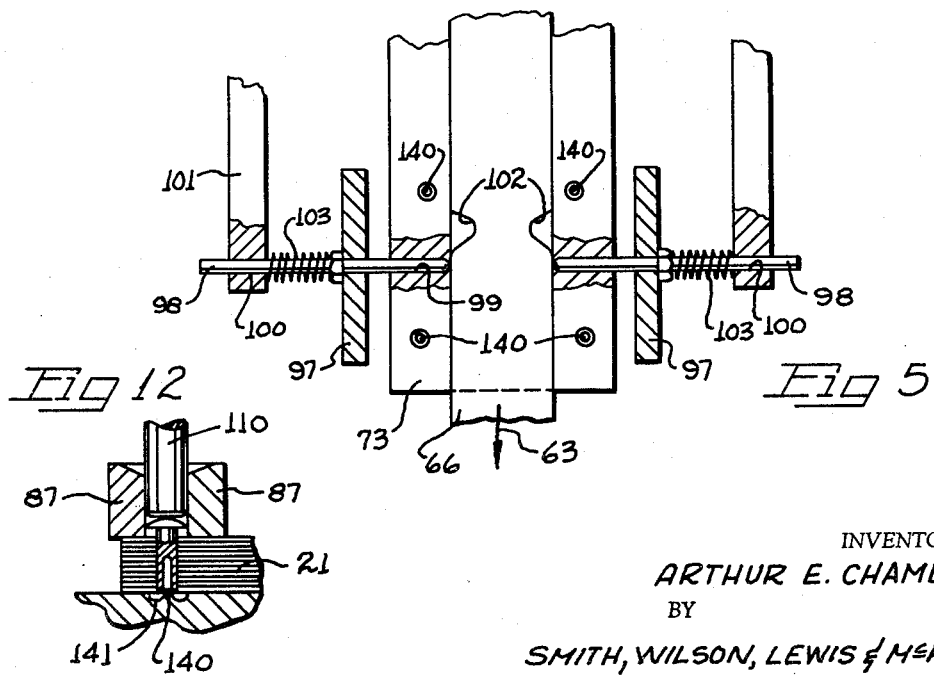
INVENTOR.
ARTHUR E. CHAMBERS
BY
SMITH, WILSON, LEWIS & McRAE July 17, 1962 A. E. CHAMBERS 3,044,652
METHOD OF ASSEMBLING AND FASTENING LAMINATIONS
Filed Nov. 5, 1958 4 Sheets-Sheet 3
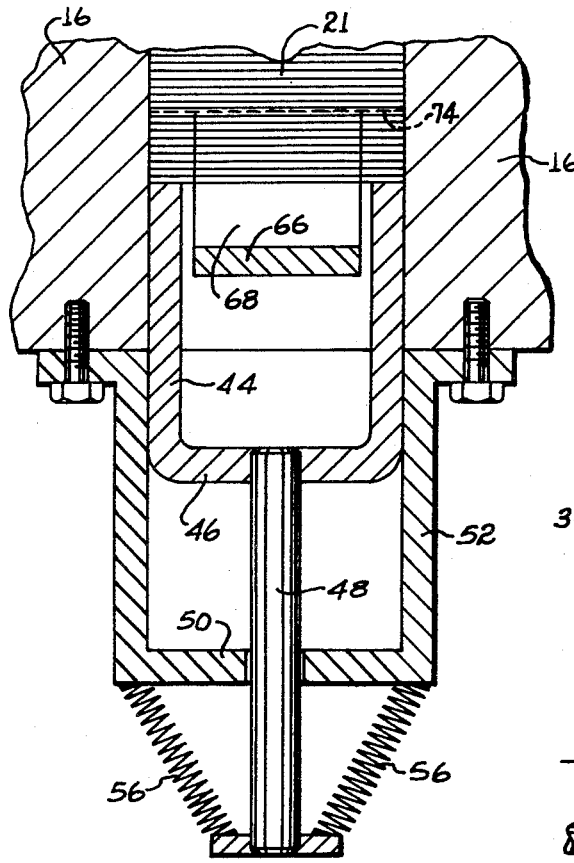
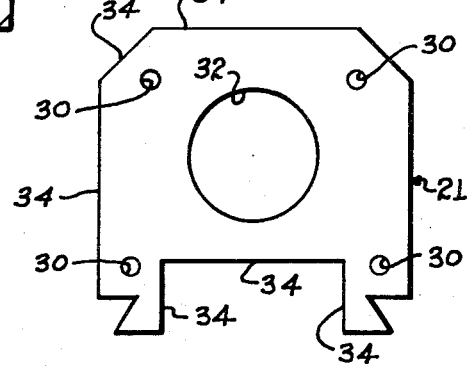
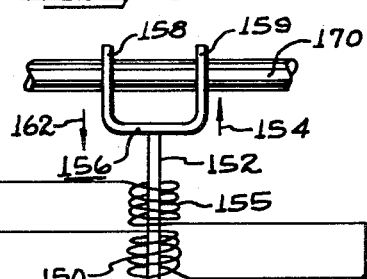
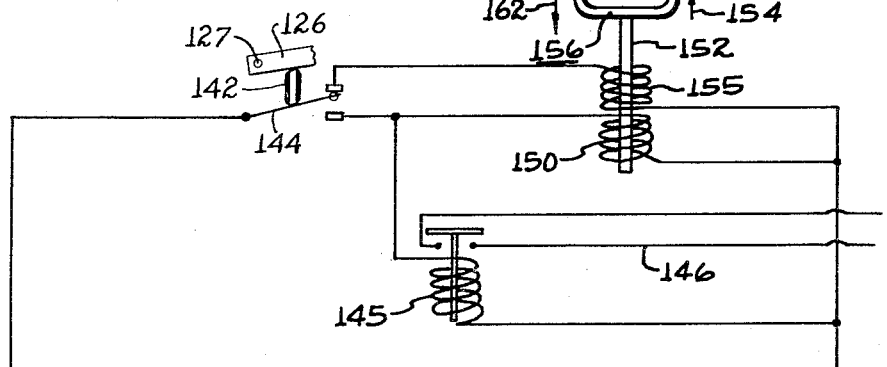
INVENTOR.
ARTHUR E. CHAMBERS
BY
SMITH, WILSON, LEWIS & McRAE July 17, 1962  A. E. CHAMBERS  3,044,652
METHOD OF ASSEMBLING AND FASTENING LAMINATIONS
Filed Nov. 5, 1958  4 Sheets-Sheet 4

INVENTOR.
ARTHUR E. CHAMBERS
BY
SMITH, WILSON, LEWIS & McRAE

United States Patent Office 3,044,652
Patented July 17, 1962

3,044,652
METHOD OF ASSEMBLING AND FASTENING LAMINATIONS
Arthur E. Chambers, 21370 Knudsen Drive, Grosse Ile, Mich.
Filed Nov. 5, 1958, Ser. No. 772,049
2 Claims. (Cl. 218—29)

This invention relates to a method of sequentially forming laminations, arranging said laminations in a stack, and securing the individual laminations together, as for example by means of rivets. The invention has particular application in the manufacture of laminated cores and coil structures utilized in electric motors, transformers, relays, solenoids and ballasts.

Other objects of this invention will appear in the following description and appended claims, reference being had to the accompanying drawings forming a part of this specification wherein like reference characters designate corresponding parts in the several views.

In the drawings:

FIG. 1 is a longitudinal sectional view through one embodiment of the invention;

FIG. 2 is a sectional view on line 2—2 in FIG. 1;

FIG. 3 is a sectional view on line 3—3 in FIG. 1;

FIG. 4 is a left elevational view of the FIG. 1 embodiment;

FIG. 5 is a sectional view on line 5—5 in FIG. 4;

FIG. 6 is an enlarged sectional view on line 6—6 in FIG. 1;

FIG. 7 is a plan view of the lamination product formed by the FIG. 1 apparatus;

FIG. 8 is a diagrammatic view showing an electrical control circuit utilized in the FIG. 1 embodiment;

FIG. 12 is a sectional view on line 12—12 in FIG. 9, but with certain parts displaced from their FIG. 9 positions.

Figure 9:
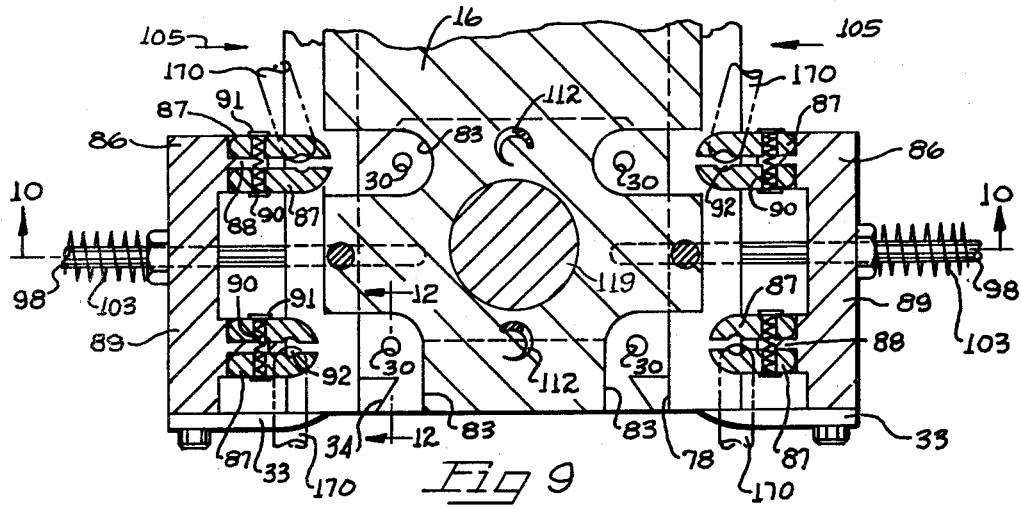
FIG. 9 is a view taken on line 9—9 in FIG. 4.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown one embodiment of the invention which includes a base plate 10 having a hollow portion 12 for reception of cut away material formed during the stamping of laminations out of metal strip material 14. Base plate 10 is adapted for positionment on a conventional machine structure (not shown) which develops power for the stamping operation and which serves as a collection mechanism for cuttings formed during the stamping operation.

The illustrated apparatus defines a lamination-forming station 13, a lamination-collection station 15, and a lamination fastener station 17.

*Lamination-Forming*

Lamination-forming station 13 comprises a stationary support member 16 which forms a bed surface 18 for receiving strip material 14 traveling in the arrow 20 direction. Positioned above bed surface 18 is a housing structure 26 which houses the various cutter elements utilized in the progressive die operations required to form the lamination article 21 shown in FIG. 7. Housing structure 26 is fixedly carried on four upstanding piston rods 28 which extend downwardly beyond base plate 10 into the subjacent mechanism. Depending from housing 26 are four guide rods 24 which slidably support a stripper plate 22, said stripper plate being provided with through openings 25 slidably receiving the cutter elements 27a, 27b, and 27c. Rods 24 slidably engage in bores 29 formed in member 16. The arrangement is such that on the downstroke of housing 26 stripper plate 22 contacts material 14 prior to contact between the cutter elements and material 14, and during each upstroke of housing 26 stripper plate 22 remains in contact with material 14 until the cutter elements have left the work material. Plate 22 thus functions to apply pressure to the work and prevent the work material from being carried upwardly with the cutter elements on the upstroke. Plate 22 may apply pressure to material 14 either by its own weight or by means of springs (not shown).

In operation of the illustrated apparatus, power means within the subjacent mechanism is cyclically operated to cause vertical reciprocation of piston rods 28 so as to raise and lower housing structure 26. On the downstroke, stripper plate 22 applies pressure to material 14, and then the cutter elements penetrate through material 14. On the upstroke the cutter elements leave material 14, after which the stripper plate 22 is lifted off of material 14 by the lifting engagement between shoulders 31 and plate 22. The arrangement is such that the various cutter elements simultaneously pierce strip material 14 for progressively cutting the material to its FIG. 7 configuration. The sequence of cutting operations may be varied considerably, but in one sequence the first set of dies 27a acts on strip material 14 to form the four small holes 30, (FIG. 7) the second cutting die 27b acts on material 14 to form the large central hole 32, and the next succeeding die 27c acts on strip material 14 to form the various lamination edges 34. It will be understood that during operation of the mechanism strip material 14 is automatically indexed in the arrow 20 direction for a predetermined distance during the time period between raising of the housing structure 26 and the next succeeding downstroke of said housing structure. It will also be understood that member 16 is provided with various vertical openings for reception of the strip material 14 which is cut away during the lamination-forming operation.

During the lamination-forming operation the lateral edge portions of strip material 14 are not completely cut through; as a result there emerges from the lamination-forming station a continuous strip of scrap material. This scrap material has a direction of motion such that it would strike against certain portions of mechanism 17 (see FIG. 1) if it were allowed to continue its movement. In order to prevent such continued movement there is provided a cutter structure 36 which is fixedly carried on the downstream end of housing structure 26; the arrangement being such that during each downstroke of housing structure a section 38 of scrap material is cut away so as to be deposited in a trough structure 40 from whence it can be removed, either manually or mechanically.

During its final formation step the FIG. 7 lamination is discharged from bed 18 into a chute structure 42 which is of the same configuration as the FIG. 7 lamination, the arrangement being such that during each downward movement of housing structure 26 the last cutting die forces the formed lamination into the chute structure 42.

Although a specific arrangement of cutter elements, stripper plate and scrap disposal mechanism has been shown in the drawings, it will be appreciated that the invention is not limited in its application to the illustrated arrangement. Rather the invention may be utilized with any suitable device for forming a lamination, either of the FIG. 7 configuration or other configuration.

Lamination-Collecting

Chute structure 42 serves as a collection structure for the laminations, it being noted that after a number of operational cycles of structure 26 a series of the laminations will become stacked up in chute structure 42. Preferably the chute structure has a rather close frictional fit on the laminations so that the stack of laminations is self-sustaining. However, during each downward movement of housing structure 26 the last cutting die forces the uppermost lamination to descend a predetermined distance into the chute structure so that the stack of laminations is successively lowered toward a U-shaped support member 44 (FIGS. 1 and 6). Member 44 is provided with a web portion 46 which is fixedly secured to a post member 48 slidably extended through the web portion 50 of a fixed mounting member 52. A pair of light tension springs 56 are provided between member 52 and the lower end of post 48 (as shown in FIG. 6) so as to maintain the upper ends of member 44 against the lowermost lamination. As the stack of laminations descends in chute structure 42 a tripper element 58 carried by member 44 is caused to move toward the actuator button 59 of an electric switch 60.

At a predetermined point in the downward travel of member 44 switch 60 is actuated. Actuation of switch 60 is effective to introduce pressure fluid into cylinder 64 so as to move piston rod 62 (FIG. 1) from its illustrated position in the arrow 63 direction. Control of the pressure fluid is effected by conventional solenoid valves operated by switch 60, and since such control valves are conventional in the art they have not been illustrated.

Piston rod 62 is fixedly connected to a plate 65 which is in turn fixedly connected to a slide element 66. Element 66 slidably extends within a slideway 69 formed in a fixed guide member 73 which is provided with a plate 77 for retaining the slide element in the slideway. The right end portion of slide element 66 is provided with a recess 67, above which is positioned a sweeper block element 68. A pair of compression spring 70 (FIG. 2) are provided for normally urging block 68 in an upward direction, said upward movement being limited by a pair of bolts 71 having head portions 72 located within counterbores formed in block 68. The purpose in providing springs 70 is to insure that block 68 will extend to the proper height against bolt heads 72 so that the proper number of laminations will be engaged during movement of piston rod 62 in the arrow 63 direction to displace the block 68 and the laminations contacted by the face 75 thereof to the left. Such displacement of the block 68 brings the block into vertical alignment with the stack 21 and the additional, non-displaced laminations are superimposed on the block. Spring 70 may then collapse as additional laminations are added to stack 21 in chute 42 by the action of the cutting elements. Thus, the laminations may continue to be produced while block 68 is directly under stack 22. This will permit a time lag in the riveting operation (to be described hereinafter) without interfering with the continuous production of laminations.

In operation, as switch 60 is energized to cause movement of piston rod 62 in the arrow 63 direction, face 75 of block 68 is caused to press against the adjacent edges of the laminations in chute 42 so as to carry said laminations into the dotted line position 76. During its movement to the dotted line position 76 the lamination stack has its lateral edges slidably engaged with surfaces 78 of member 16; as a result the individual laminations are prevented from moving laterally relative to one another in such manner as to put the rivet-receiving holes 30 out of alignment with one another.

In the dotted line position 76 the lamination stack is located immediately upstream from the lamination-fastener station 17. Movement of the lamination stack from position 76 into the fastener station 17 is effected by the next succeeding arrow 63 movement of piston rod 62. Thus, as an additional lamination stack is formed on member 44 and displaced to the left (in FIG. 1) the previously formed lamination stack in position 76 is pushed into phantom line position 80 against stop members 33 within fastener station 17.

Lamination-Fastening Operation

Fastener station 17 includes the left end portion of member 16, which is cut away in the four areas designated by numerals 83 (FIG. 9) to accommodate the yieldable fingers 87 of two rivet positioning mechanisms 86. Yieldable fingers 87 are loosely positioned against the inwardly extending arm portions 88 of bodily movable members 89, and are urged against said arm portions by means of tension springs 90, which are held in place by pins 91. It will be noted from FIGS. 9 through 11 that the inner end portions of fingers 87 are provided with semi-circular recesses 92 and semi-conical recesses 93, the arrangement being such that opposed ones of recesses 92 cooperate together to define a generally cylindrical passage, and opposed ones of recesses 93 cooperate together to define an upwardly diverging passage. It will be seen from FIG. 11 that these passages are intended to receive conventional rivets 94, with the heads 95 thereof being positioned in the diverging recesses and rivet shank portions 96 being received in the cylindrical passages.

Figure 10:
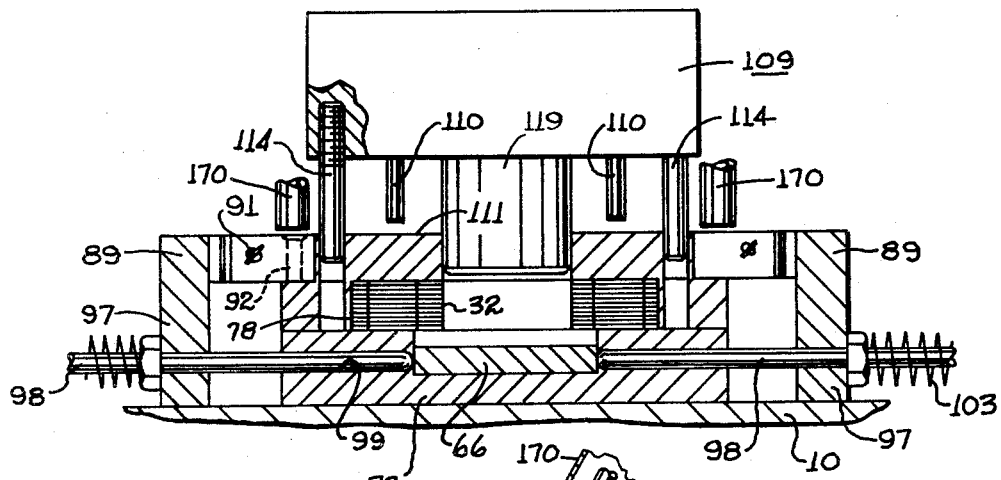
FIG. 10 is a sectional view taken on line 10—10 in FIG. 9.

It will be noted from FIG. 9 that there are provided four sets of yieldable fingers 87 corresponding to the four rivet-receiving openings 30 in the laminations. However members 89 (which carry fingers 87), as shown in FIG. 9, are displaced laterally from member 16 in "rivet loading" positions. In order to set members 89 for driving of the rivets into the laminations there is provided the mechanism shown in FIG. 5. The mechanism includes a pair of members 89 having extensions 97 which are carried on rods 98, the rods 98 and the extensions 97 being comovable, respectively, toward the slide elements 66. The inner ends of rods 98 are slidably guided in openings 99 formed in member 73, and the outer ends of rods 98 are slidably guided in openings 100 formed through fixed guide blocks 101 carried by base plate 10.

During movement of slide element 66 in the arrow 63 direction (under the influence of piston rod 62) recesses 102 formed in the slide element 66 are caused to move into registry with the rods 98 so as to allow the compression springs 103 to force the rods into recesses 102. During this movement of rods 98 members 89 are carried inwardly in the arrow 105 directions (FIG. 9), so as to cause the seated rivets in fingers 87 to be moved into vertical registry with the openings 30 formed in the subjacent stack of laminations (at position 80).

As soon as the rivet seat structures 87 are positioned above the openings 30 in the laminations the riveting operation can be carried out. In order to perform the riveting operation there is provided a riveting head 109 having four depending pressure pins 110 positioned in vertical registry with the lamination openings 30 (when the stack is in its position 80). A pair of compression springs 112 normally urge head 109 upwardly to a position wherein pins 110 are spaced above the plane of surface 111 of member 16. However, by the application of a downward force on head 109 the action of springs 112 is overcome and pins 110 are driven downwardly against rivet heads 95 for driving the rivets into the lamination openings 30. Vertical movement of head 109 is guided and controlled by means of two guide pins 114 and central pilot plunger 119, said plunger having the additional function of moving through lamination central openings 32 so as to prevent any slight misalignment of the rivet-receiving openings 30. The lower end of plunger 119 is below the lower end of rivets 94 prior to the riveting operation so that plunger 119 penetrates through the various central openings 32 in the lamination stack prior to entry of rivet shank portions 96 into the various lamination openings 30. As a result the various openings 30 are precisely aligned to insure jam-free operation during the riveting step.

In the illustrated embodiment the motive force for effecting downward movement of head 109 is developed through an arm 126 which is pivoted at 127 on an upstanding post 128 (FIG. 4). It will be noted that in the FIG. 1 position arm 126 is located slightly to the left of a block 130 pivotally mounted at 132 on a support structure 134 carried by the housing 26. A tension spring 135 is trained between block 130 and structure 134 so as to normally retain block 130 in its FIG. 1 position against the action of a second tension spring 137. However, during movement of piston rod 62 in the arrow 63 direction spring 137 is sufficiently stretched that it develops a tension force overcoming the action of spring 135. Thus, when piston rod 62 is in its leftmost position block member 130 is pivoted to a position in vertical registry with arm 126. During the subsequent downward movement of housing 26 (by lowering of piston rods 28) member 130 transmits a downward force to arm 126 such that head 109 is driven downwardly from its FIG. 1 position. During this downward movement the rivets 94 are driven from the space between yieldable fingers 87 through the lamination openings 30. The "yieldable" nature of the fingers enables the rivet heads 95 to freely pass through the cylindrical passage defined by finger surfaces 92.

As the hollow rivet shank portions 96 pass through the lowermost lamination in the lamination stack (FIG. 12) they strike the annular side surfaces of nibs 140 so as to be forced apart. Further downward movement of the rivets causes their lower annular portions to engage the annular surfaces 141 so as to be turned in an upward direction for finally being clinched against the lower face of the lamination stack.

It will be noted that riveting head 109 is only moved downwardly when piston rod 62 is in its leftmost position. Such a position of piston rod 62 is attained only after a lamination stack of sufficient height has been formed on member 44 and transferred to position 80. During the cyclic operation of housing structure 26 necessary to build up a lamination stack there is no movement of riveting head 109.

*Rivet Feeding Operation*

After each riveting cycle it is necessary that rod 62 be shifted to the right and that rivets be fed into the yieldable fingers in order to set the apparatus for the next cycle. In the illustrated embodiment these operations are performed automatically by movement of force-applying arm 126. Thus, during a riveting operation arm 126 strikes the button 142 of an electric switch 144. It will be noted from FIG. 8 that switch 144 is located in circuit with a relay coil 145, said coil controlling current flow in a circuit 146 for operating electric valve structure (not shown) to move piston rod 62 from its leftmost position to its FIG. 1 position. During such movement spring 137 is shortened so as to allow spring 135 to move block 130 to its FIG. 1 position out of registry with arm 126. Also, during such rightward movement sweeper block 68 is caused to move back to its FIG. 1 position where it is again in position to operate on a lamination stack formed by a predetermined number of downstrokes of housing structure 26.

It will also be noted from FIG. 8 that switch 144 is in a circuit through coil 150. Coil 150 operates on an armature 152 to move it in the arrow 154 direction. Armature 152 is connected to a U-shaped structure 156 having a pair of parallel arm portions 158 and 159 provided with offset circular openings 160 and 161. Armature 152 extends through a second coil 155 connected in parallel with coil 150, the action of coil 155 being such as to urge the armature in the arrow 162 direction.

Structure 156 is positioned to encircle the lower end portion of a circular rivet feeder tube 170, said rivet tube having slots extending around a portion of its periphery for accommodating movement of arm portions 158 and 159 in the directions of arrows 154 and 162. In operation, when switch 144 is in its FIG. 8 position coil 155 is energized so as to pull member 156 in the arrow 162 direction; such movement causes circular openings 161 in arm 159 to become concentric with tube 170 so as to allow the lowermost rivet 175 in the rivet stack to gravitate downwardly into position between yieldable fingers 87. Also during such arrow 162 movement arm 158 is caused to have its opening 160 displaced out of registry with the tube axis so as to enable the outer end portion of arm 158 to move underneath the head of rivet 178; as a result rivet 178 and the superjacent rivets are prevented from dropping out of the feeder tube 170.

Figure 11:
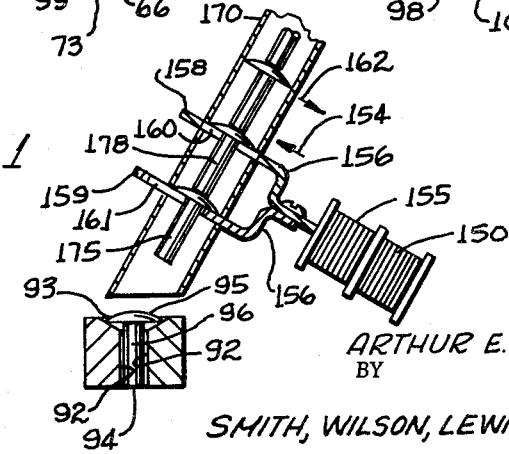
FIG. 11 is an enlarged sectional view of a rivet feed tube employed in the FIG. 1 embodiment.

When switch 144 is moved from its FIG. 8 position to energize coil 150, the resultant movement of armature 152 in the arrow 154 direction returns member 156 to its FIG. 11 position. In this position opening 160 is aligned with the feeder tube axis so that rivet 178 is free to drop down to the position vacated by rivet 175. It will thus be seen that a push-pull movement of member 156 (by alternate energization of coils 150 and 155) is effective to discharge one rivet from the feeder tube and replace said rivet with the next superjacent rivet in the stack.

The sequence of operations is such that on the downstroke of arm 126 switch blade 144 is moved downwardly (FIG. 8) to energize coil 150 and thereby to cause downward movement of the stacked rivets in tube 170 (without any discharge of rivets from the tube). On the upstroke of arm 126 switch blade 144 is moved to energize coil 155 for discharging the lowermoset rivet 175 into the seat structure defined by yieldable fingers 87. The end result is to feed one rivet from each feeder tube 170 into the opposed yieldable fingers 87 after each riveting operation.

FIG. 8 shows only two coils 150 and 155 controlled by switch 144. However it will be understood that in practice eight coils would be employed with the illustrated embodiment (which is equipped with four feeder tubes 170). Each feeder tube is of course equipped with rivet feeding structure similar to that shown in FIG. 11.

*General Operation*

The general sequence of operations is such that strip material 14 is indexed onto bed 18 by conventional means (not shown), and during the intervals between each indexing movement housing structure 26 is moved downwardly to cause a shearing of the strip material such that during each downstroke one of the FIG. 7 laminations is discharged into chute structure 42. The lamination stack is forced downwardly against the upper face of member 46 so as to depress said member and, after the attainment of a predetermined stack height, effect actuation of switch 60.

Actuation of switch 60 causes sweeper member 68 to convey the lamination stack from member 44 to the dotted line position 76. During such a conveying movement the conveyed lamination stack pushes the previously formed lamination stack 76 into the dotted line position 80. The movement of member 68 takes place during the indexing movement of strip 14 so that immediately after completion of the leftward movement of member 68 housing structure 26 moves downwardly without interruption. During leftward movement of member 68 the block 130 is moved into registry with arm 126; as a result, on the next subsequent downward cyclical movement of housing structure 26 a lamination is formed and driven into chute structure 42, and a riveting operation is simultaneously performed on the lamination stack occupying the dotted line position 80. In this connection, during the leftward movement of block 68 the rods 98 are caused to move into recesses 102 (FIG. 5) so as to position the rivet seat structures 87 in vertical registry with the openings 30 in the lamination stack occupying position 80 (thus making possible a riveting operation during the next downstroke of housing 26). Leftward movement of block 68 is also utilized to discharge the previously riveted lamination stack from the apparatus. In this connection it will be noted that when member 68 is in its rightmost position (FIG. 1) the rods 98 and members 97 are in their outermost positions, with the stop members 33 drawn radially outward to permit discharge of the riveted lamination stack.

The riveting operation is accomplished on a single downstroke of housing structure 26. Thus a downward force is applied from housing structure 26 through block member 130 and arm 126 to the riveting head 109. The pressure pins 110 are thereby caused to strike the head portions 95 of the rivets in members 87 so as to drive said rivets through the lamination openings 30 and cause the lower end portions of the rivet shanks to be deflected by surfaces 140 and 141 in such manner as to clinch the rivets against the lower fact of the lamination stack.

As the rivet-clinching operation is completed the switch 144 is operated by button 142 to energize coil 145 for thereby causing piston rod 62 to be moved to the right (FIG. 1). (This switch operation also energizes coil 150 for causing it to move member 156 in the arrow 154 direction.) Rightward movement of piston rod 62 is effective to move members 89 and spring fingers 87 to the FIG. 10 position wherein they are located to subsequently receive a rivet 175 from feeder tube 170 (FIG. 11). Additionally, the FIG. 8 control circuitry is such that switch 144 not only effects movement of piston rod 62 to the right but thereafter (on the upstroke of arm 126) also effects energization of coil 155 for causing discharge of the lowermost rivet 175 out of the feeder tube 170 into fingers 87.

It will be noted that there has been illustrated and described an apparatus which is completely automatic without requiring any manual operations between the lamination forming stage and the discharge of a riveted lamination stack. Thus, all of the component mechanisms operate in synchronism with one another so as to quickly form and assemble laminations together. In this connection it will be noted that the lamination-riveting operation is synchronized with the lamination-forming operation in such manner that a riveting operation is performed automatically during one of the lamination-forming operations; as a result the apparatus is limited in its output only by the time required to form the laminations, and there is no lost time involved.

It will also be noted that the illustrated apparatus incorporates a simplified rivet seating and positioning mechanism which operates automatically without human intervention or assistance. The construction of yieldable fingers 87 is such that the rivets are gripped in a precise location, while still obtaining the advantage of yieldableness for passage of rivets during the rivet driving operation.

It will also be noted that the illustrated apparatus employs a minimum number of control switches for controlling the operation of the mechanism; as a result the mechanism can be quickly installed and operated through a long service life without malfuctioning. The long service life is also due in part to the construction of the mechanism wherein the lamination stack is accurately formed and closely guided during its movement and riveting. In this connection it will be noted that the lamination has a comparatively short length of travel between the point of its formation (adjacent the upper end of chute structure 42) and its arrival in the riveting station; as a result, there is a minimum possibility of parts jamming during the working cycle.

It will also be noted that the illustrated apparatus is of compact character with all power being derived from a single prime mover. The compactness of the mechanism permits it to be easily accommodated with existing power units and receiver devices so as to readily adapt it for use with other automatic machinery, as for example machinery utilized in the manufacture of electric motors in an "automationed" manner.

I claim:

1. In a method of making a laminated assembly from a plurality of rigid laminae cut from strip material by cooperative male and female dies and having registering apertures for receiving securing rivets, the steps of advancing successive laminae through the female die, forming said laminae into a stack generally beneath the female die, intermittenly separating from the end of the stack remote from the die that number of laminae required to form an assembly, positioning the separated laminae adjacent a rivet deforming surface with one terminal lamina being in contact with the surface, longitudinally aligning rivets with the registering apertures of the laminae, longitudinally displacing the rivets to enter the rivets in the aligned apertures of the plurality of laminae, forcing the rivets into contact with said deforming surface, thereby securing the separated laminae into a riveted assembly, and releasing the riveted assembly.

2. In a method of making a laminated assembly from a plurality of rigid laminae cut from strip material by cooperative male and femal dies and having registering apertures for receiving securing rivets, the steps of forming a stack of a number of aligned, registering laminae, the number of laminae in the stack exceeding the number required for a single laminated assembly, separating from the stack only that number of laminae required to form an assembly, interposing the separated laminae between a rivet deforming surface and a rivet carrier with one terminal lamina being in contact with the surface, aligning the registering apertures of the laminae with rivets retained by the carrier, displacing the rivets from the carrier into the aligned apertures of the plurality of laminae, forcibly contacting said rivets with said surface, and releasing the riveted assembly.

References Cited in the file of this patent

UNITED STATES PATENTS

| | | |
|---|---|---|
| 1,809,154 | Becker | June 9, 1931 |
| 1,997,550 | O'Leary | Apr. 9, 1935 |
| 2,069,241 | Gookin | Feb. 2, 1937 |
| 2,126,161 | Woodward | Aug. 9, 1938 |
| 2,266,427 | Levy-Hawes | Dec. 16, 1941 |
| 2,315,256 | Haegele et al. | Mar. 30, 1943 |
| 2,421,639 | Muther et al. | June 3, 1947 |